April 21, 1942.                T. A. BOWERS                2,280,743
                            PISTON RING DEVICE
                           Filed July 5, 1941
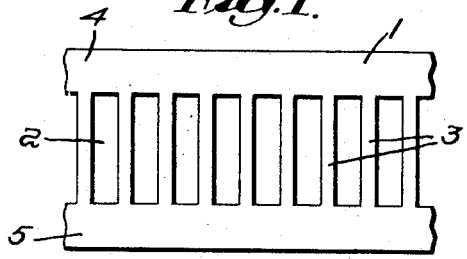
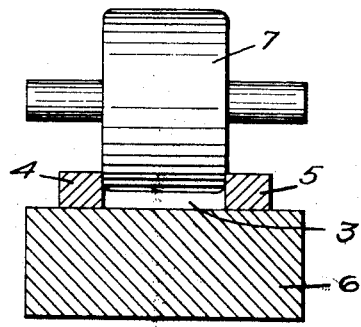
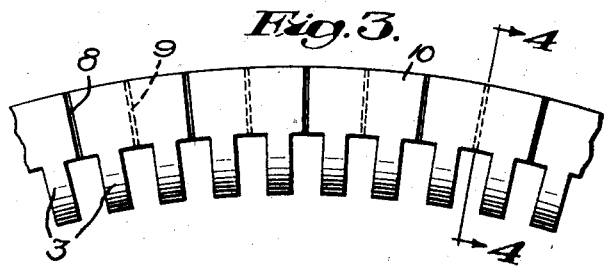
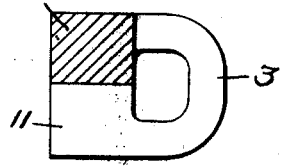
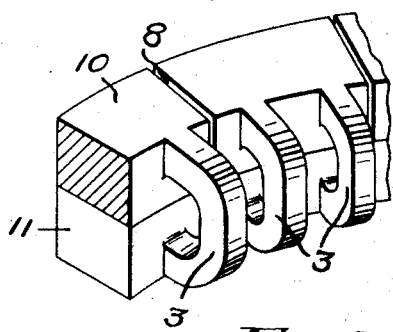
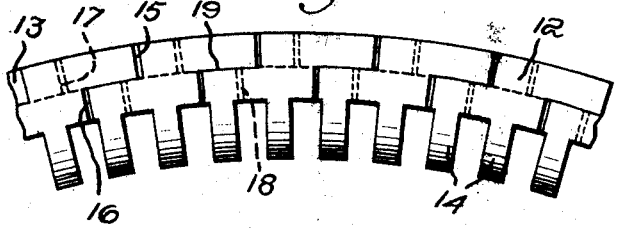
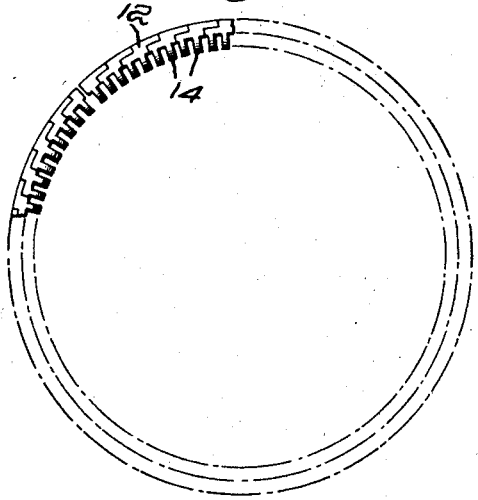
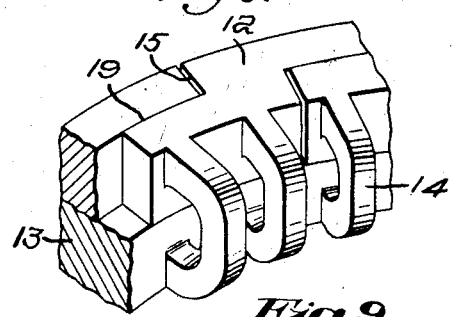
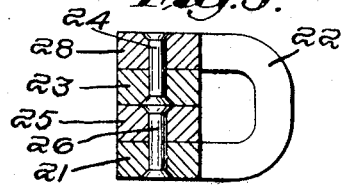
Inventor:
Thomas A. Bowers
by Munn N. Hamilton
Attorney Patented Apr. 21, 1942

2,280,743

UNITED STATES PATENT OFFICE 2,280,743

PISTON RING DEVICE

Thomas A. Bowers, Mattapoisett, Mass., assignor to Power Research Corporation, Boston, Mass., a corporation of Massachusetts Application July 5, 1941, Serial No. 401,187

5 Claims. (Cl. 309—45)

This invention relates to piston rings and in general to the type of piston ring disclosed in my earlier Patent No. 2,224,338, issued December 10, 1940, and my copending application Ser. No. 354,839, filed August 30, 1940.

The principal object of the invention is to improve piston rings and to devise of sheet materials piston ring structures of the same general character as those described in the above referred to applications, in which a plurality of segments are arranged in annular rows and the segments are supported in circumferentially movable relation to one another. Another object of the invention is to devise a piston ring having a novel arrangement of segments and connecting portions for the segments, with the object in view of improving the sealing character of such rings. Another object of the invention is to provide an improved piston ring of the type in which a strip of piston ring material is bent longitudinally of itself. Still other objects are to provide piston ring structures which are adapted to manufacture by tool machinery which can be quickly made and which are generally simple, cheaper, and more efficient in operation.

The nature of the invention and its objects will be more fully understood from the following description of the drawing and discussion relating thereto.

In the accompanying drawing:

Fig. 1 is a fragmentary plan view illustrating a step in the method of making the ring of the invention;

Fig. 2 is a diagrammatic view partly in cross section illustrating another step in the method referred to;

Fig. 3 is a fragmentary plan view illustrating still other steps in the method.

Fig. 4 is a cross section taken on the line 4—4 of Fig. 3.

Fig. 5 is an enlarged fragmentary perspective view of a finished ring of the invention;

Fig. 6 is a fragmentary plan view of a modification of piston ring;

Fig. 7 is an enlarged fragmentary perspective view of a ring similar to that shown in Fig. 6;

Fig. 8 is a plan view of a complete ring similar to the rings shown in Figs. 6 and 7; and Fig. 9 is an enlarged detail view partly in cross section illustrating another modification of piston ring.

In the construction shown in Figs. 1–5 inclusive, numeral 1 indicates a strip of sheet material employed in making the ring of the invention. The sheet is of a resilient character and may be, for example, of spring steel, an alloy, or other suitable material.

In my earlier patent above noted, I have described a piston ring constructed from a resilient metal strip which is formed with transversely disposed overlapping openings, and is folded longitudinally of itself to provide spaced-apart outer peripheral edges for metering oil. The overlapping openings in the strip define circumferentially movable segments and substantially U-shaped connecting portions.

The relatively open formation of the U-shaped connecting portions especially provides for the connecting portions being warped or twisted in directions circumferentially of the ring to close the transverse openings. Since the connecting portions are constituted of a resilient metal, they tend to spring back to their normal bent position, thereby exerting a useful flexibility and wall pressure in the ring as a whole. The ability of the connecting portions to become thus warped and create resiliency is developed to a relatively greater extent by the open formation noted, as compared to a formation, for example, where the connecting portions might be completely doubled over.

According to the present invention, I provide a piston ring of a somewhat similar type in which a plurality of connected segments are secured together in annular rows as may be obtained, for example, by folding a strip of resilient sheet metal longitudinally of itself. I further provide for the segments being arranged in superimposed relation to provide a substantially solid outer peripheral ring portion, and I combine with the substantially solid outer ring periphery, connecting portions of an open or substantially U-shaped formation which are adapted to be warped or twisted in a direction circumferentially of the ring and provide relatively great resiliency.

Referring in detail to Figs. 1–5 inclusive, I have illustrated one method of making a ring of this general character. The strip 1 is formed, by some suitable means as punching, with openings 2 which leave intermediate portions of the strip hereinafter referred to as webs or connecting portions 3.

The punched strip is subjected to a forming operation, as for example rolling, which thins the connecting portions 3 relative to the edges 4 and 5. This operation has been diagrammatically illustrated in Figs. 2 in which is shown a base 6 which supports the resilient strip 1 and over which is applied a roll 7.

The rolled strip 1 is bent along lines of bending which intersect the connecting portions 3 so as to arrange them in a generally open or U-shaped manner as has been illustrated in Figs. 3 and 4. The edges 4 and 5 of the strip, due to their relatively greater thickness, become superimposed one upon another to form a substantially solid annular section connected by the open connecting portions. The strip is further bent to form an annular body in some suitable manner, as for example by passing it through complementary circular die members.

The strip in the circular form noted is cut to provide openings 8 and 9 which extend transversely inward from its opposite edges. These openings 8 and 9 connect with the openings 2 between the connecting portions 3 in an alternate member so that the openings 8 in the bent position of the strip occur in staggered relation with respect to the openings 9, as may be more clearly seen in Fig. 3.

The openings 8 define segments 10, which are of a circumferential width adapted to include two of the connecting portions 3, while the openings 9 define alternately arranged segments 11 which also are of a circumferential width adapted to include two connecting portions 3. This provides for the connecting portions, included by any one of the segments at one edge of the ring, being attached to separate segments at an opposite edge of the ring. The relatively thicker edges 4 and 5 of the strip 1, in the folded position of the ring illustrated in Figs. 3, 4 and 5, extend beyond the connecting portions 3 in a direction axially of the ring and thus allow the connecting portions 3 to occur in an open or substantially U-shaped manner when the edges 4 and 5 are folded over upon one another.

An important feature of the ring consists in the combination of the relatively thick segments 10 and 11 disposed one against another, with a plurality of open or substantially U-shaped connecting portions. The relatively thick segments 10 and 11 provide a solid outer peripheral portion for the ring which is highly desirable in respect to wearing ability and resistance to passage of combustion gases radially therethrough. At the same time the open formation of the webs allows a maximum of warping or distortion to occur and thus insures highly developed resiliency in the ring.

It will be observed that the openings 8 are disposed in staggered relation with respect to the openings 9 so as to seal the ring with respect to passage of gases axially therethrough. When the ring is installed in a piston and engaged against a cylinder wall, the openings 8, therefore, become completely sealed with respect to gas seeking to pass from the head of the cylinder downwardly by the ring. The openings 9 while they connect from the back of the piston ring groove to points between the piston and the cylinder, and below the ring, are preferably formed sufficiently small to retain films of oil which are adapted to resist radial passage of gases and allow the ring to function as a substantially gas-proof member.

If desired, however, I may provide for sealing action by the ring, with respect to gas directed radially therethrough, independently of oil films. For example, in Fig. 6 I have illustrated a ring having relatively thick segments 12 and 13 and open, substantially U-shaped connecting portions 14. These segments 12 are separated by outer openings 15, and inner openings 16 offset with respect to the openings 15. The offset arrangement of the openings provides overlapping portions in adjacent segments. Similarly, the segments 13 are separated by outer openings 17, inner offset openings 18, and have overlapping portions.

The stepped arrangement of the inner and outer openings, forming overlapping segment portions, allows the segments to move in directions circumferentially of the ring and yet remain in contact with one another at all times along the edges 19 of the overlapping portions. With the stepped arrangement noted, the openings 15 and 16 are further arranged in staggered relation to openings 17 and 18. This provides a completely gas-tight sealing structure adapted to resist passage of gas both axially and radially therethrough, and independently of any use of oil films such as described in connection with the ring of Figs. 1-5 inclusive. The advantages pointed out in the previous ring modification with respect to the solid outer peripheral ring portion being combined with open webs adapted to efficient warping or twisting to develop resiliency, is maintained in the ring modification of Figures 6-8 inclusive. I may desire to incorporate the overlapping segment construction in a ring in which the connecting portions are completely doubled over upon one another and the edges are not relatively thicker than the connecting portions.

In Fig. 9 I have illustrated still another modification of ring in which segments 20 and 21 are connected together by open connecting portions 22. The segments 20 have segments 23, separately attached thereto as by means of rivets 24, and similarly the segments 21 have segments 25 separately attached by means of rivets 26.

The attachment of separate pieces of material to segments is illustrative of other means of obtaining a ring in which the outer segment portions extend axially beyond the open connecting portions and in which a substantially U-shaped formation of the connecting portions is preserved. A ring of the character noted may be formed in various other ways, as for example by cutting the segments out of solid ring bodies or by assembling a plurality of segments separately upon annularly arranged connecting portions of open formation, or in other ways.

It will be observed that the ring of the invention combines novel outer peripheral ring portions which are substantially continuous with inner peripheral portions. The inner peripheral portions are open and are of a generally U-shaped formation adapted to being warped or distorted to develop high resiliency. The outer peripheral ring portions are arranged in superimposed relation to provide desirable sealing effects. Also a novel overlapping segment construction has been disclosed.

While I have shown a preferred embodiment of the invention, it should be understood that various other changes may be resorted to, in keeping with the spirit of the invention as defined by the appended claims.

I claim:

1. A radially and circumferentially flexible piston ring comprising a plurality of segments of piston ring material contiguously arranged to form annular rows, web portions for connecting segments of one of the rows in superimposed relation with respect to segments of another of the said rows, said web portions extending radially inward of the ring and being circumferentially spaced apart, each of said rows of segments having radially disposed openings occurring between constituent segments, said openings being offset to provide portions in adjacent segments which overlap one another, the openings occurring between segments of one of the said rows being arranged in staggered relation with respect to the openings occurring between segments of the other of the said rows, and each of said webs having axially spaced-apart portions.

2. A circumferentially and radially flexible piston ring comprising upper and lower superimposed layers of sheet material, each of said upper and lower layers being separated by openings extending from the outer periphery of the ring in overlapping relation, said openings forming segments circumferentially movable with respect to one another, means for connecting segments of one of the said layers to segments of the other of the said layers, said connecting means having axially spaced-apart portions.

3. A circumferentially and radially flexible piston ring comprising layers of sheet metal superimposed one upon another, connecting portions for the said layers, said connecting portions extending radially inward of the ring beyond the said layers in circumferentially spaced-apart relation, said layers having overlapping radial slots defining circumferentially movable segments, and parts of each of the connecting portions adjacent their points of meeting with the layers being spaced apart in a direction axially of the ring.

4. A flexible piston ring comprising upper and lower layers of sheet material superimposed one upon another, means for connecting the said upper and lower layers together, each of said upper and lower layers being separated to form segments, the adjacent segments of the respective layers having portions which overlap one another and presenting inner interstices and outer interstices offset with respect thereto, means for connecting segments of one layer to segments of the other layer, each of said connecting means having axially spaced-apart portions, and each of said segments extending beyond its respective connecting means in one direction axially of the ring.

5. A piston ring comprising a plurality of segments of piston ring material arranged in contiguous relation to form upper and lower annular rows, connecting portions for supporting segments of one of the rows in superimposed relation with respect to segments of the other of the rows, said segments constituting a substantially solid outer peripheral portion of the ring and said connecting portions having openings extending therethrough in a direction circumferentially of the ring to provide substantially U-shaped elements.

THOMAS A. BOWERS.